July 18, 1961 J. P. BARKDOLL Re. 25,011

TYPEWRITER HAVING POWER OPERATED INSTRUMENTALITIES

Original Filed Sept. 30, 1957 4 Sheets-Sheet 1

JOSEPH P. BARKDOLL
INVENTOR

BY Theodore E. Simonton
ATTORNEY

TYPEWRITER HAVING POWER OPERATED INSTRUMENTALITIES

Original Filed Sept. 30, 1957 4 Sheets-Sheet 2

JOSEPH P. BARKDOLL
INVENTOR

BY Theodore E. Simonton
ATTORNEY

TYPEWRITER HAVING POWER OPERATED INSTRUMENTALITIES

Original Filed Sept. 30, 1957 4 Sheets-Sheet 3

JOSEPH P. BARKDOLL
INVENTOR

BY Theodore E. Simonton
ATTORNEY

TYPEWRITER HAVING POWER OPERATED INSTRUMENTALITIES

Original Filed Sept. 30, 1957 4 Sheets-Sheet 4

JOSEPH P. BARKDOLL
INVENTOR

BY Theodore E. Simonton
ATTORNEY

United States Patent Office

Re. 25,011
Reissued July 18, 1961

25,011

TYPEWRITER HAVING POWER OPERATED INSTRUMENTALITIES

Joseph P. Barkdoll, Groton, N.Y., assignor to Smith-Corona Marchant Inc., Syracuse, N.Y., a corporation of New York Original No. 2,901,079, dated Aug. 25, 1959, Ser. No. 686,925, Sept. 30, 1957. Application for reissue Aug. 26, 1960, Ser. No. 52,319
25 Claims. (Cl. 197—17)

Matter enclosed in heavy brackets [ ] appears in the original patent but forms no part of this reissue specification; matter printed in italics indicates the additions made by reissue.

The invention relates to improvements in typewriters having power operated instrumentalities.

Objects of the invention are to provide improved means for effecting key controlled power operation of the type bars and other instrumentalities of a typewriter at high typing speeds and with minimum wear and noise; to provide improved means for operating such instrumentalities characterized by simplicity, compactness, low cost of manufacture and ease of assembly and servicing; and to provide an efficient system of key controlled and power operated type bar actions requiring very little power for their effective operation and permitting their incorporation in a very small and low typewriter of light weight which is easily portable.

A specfic object of the invention is to provide power means for actuating the type bars and certain other instrumentalities of the known "Smith-Corona" key-operated portable typewriter without materially increasing the size of that typewriter.

Other objects of the invention will appear from the following detailed description of the invention as shown in its preferred embodiment in the accompanying drawings.

Figure 1:
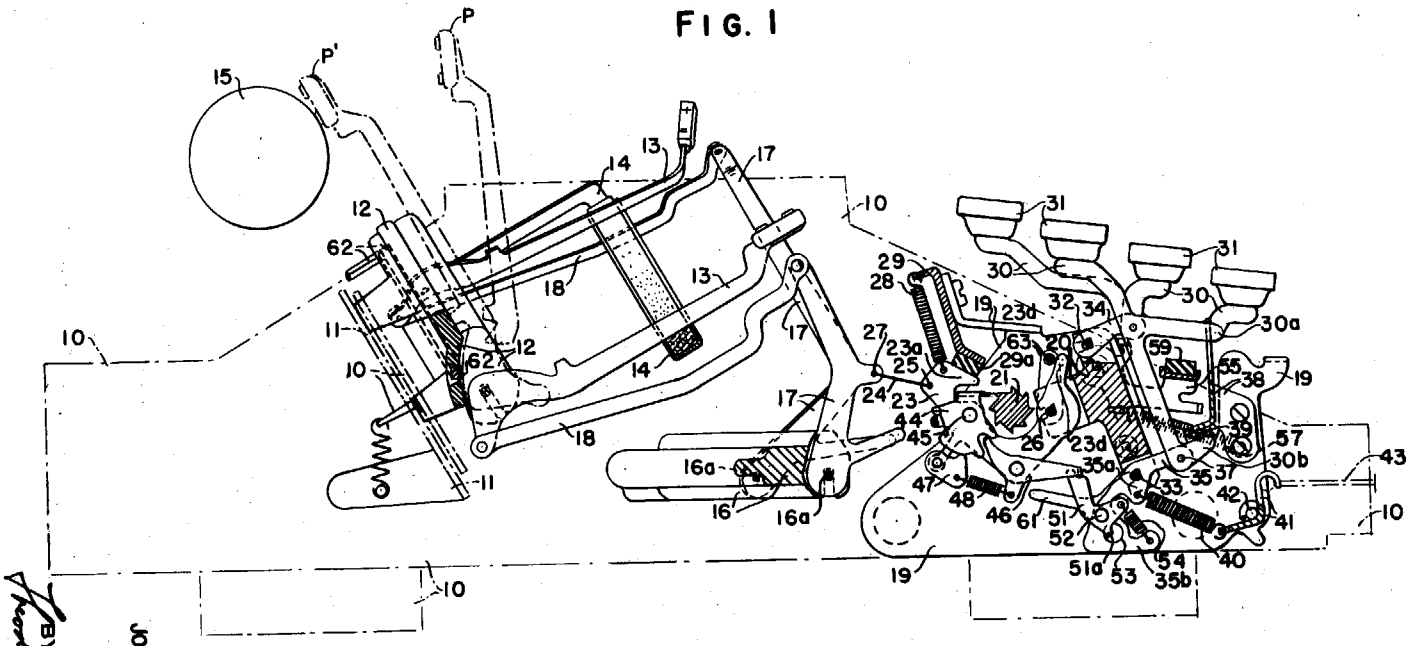
FIGURE 1 is a fragmentary vertical longitudinal sectional view of the improved machine taken on the line 1—1 of FIGURE 3 and in which a central and an outermost side type bar action are shown.

Power mechanism embodying the invention may be used for operating various parts of typewriters and like machines. For purposes of illustration, a preferred form of key controlled power mechanism embodying the invention is shown in the drawings for operating the type bars and certain other instrumentalities of a small portable typewriter which otherwise is similar to the known "Smith-Corona" key-operated portable typewriter. Only a few parts of the known typewriter are shown to assist in understanding the use of the improved power mechanism for actuating conventional parts of a typewriter.

The conventional parts of the known typewriter shown are substantially similar to those shown and described in detail in United States Patent 1,981,982, granted November 27, 1934, to H. A. Avery and, therefore, need only be described briefly. These parts include a main frame 10 which is substantially rectangular in plan, having a pair of side plates, front and rear end plates, and an intermediate cross plate which is inclined rearwardly and supports a case shift frame 11 carrying a type bar segment 12. The segment is inclined rearwardly at an angle of 30 degrees to the vertical and has pivoted therein the usual arcuate system of type bars 13 each of which carries a lower case type and an upper case type. The segment and a type bar rest 14 are connected with the shift frame to support the type bars in upwardly and forwardly extending position to swing 90 degrees through printing strokes to print at the upper front portion of the roller platen 15, the segment being shiftable downwardly in its inclined plane by the shift frame for typing of upper case characters. Platen 15 is supported on the main frame by the usual platen carriage, not shown.

A horizontally disposed sub-lever segment 16 is secured to the side plates of the main frame and curves rearwardly from the middle to the sides of said frame. This segment pivotally supports the known arcuate array of upstanding type bar actuating sub-levers 17, which sub-levers progressively increase in length from the two medial sub-levers to the two end sub-levers. The heels of the type bars are pivotally connected to the upper ends of their respective actuating sub-levers by the known links 18 which all are of equal length and extend generally parallel to the type bars to pivotal connections with the sub-levers closely underlying the outer or forward ends of the type bars.

In the known typewriter the sub-levers are rocked forwardly by key operated means to swing their connected type bars to printing position at the known printing point on the platen. According to the present invention the sub-levers are rocked by power means to actuate the type bars, and the preferred embodiment of key controlled power means shown in the drawings for rocking the sub-levers now will be described.

The key controlled power means and a supporting sub-frame 19—20 therefor are mounted in the forward part of the main frame 10 forwardly of the arcuate array of sub-levers 17, said sub-frame comprising side plates 19 attached to the side plates of the main frame and a straight horizontal fulcrum bar 20 which is attached at its ends to side plates 19 and extends transversely of the machine. The power means and sub-frame thus may be assembled as a unit and mounted in the main frame for connection with the sub-levers 17. A universal driving element or toothed rotary snatch roll 21 of known form for driving all of the type bars extends horizontally across the machine parallel to and immediately behind the fulcrum bar 20 and is journalled in the side plates 19 of the sub-frame. Fixed on the left hand end of the snatch roll is a pulley 22 forming part of a suitable operating connection from the snatch roll to a suitable electric motor, not shown, by which the snatch roll is constantly rotated counterclockwise, as viewed in FIGURE 1, while the machine is in use.

Each sub-lever 17 is actuative by a different one of an array of identical toggles. The toggles lie in parallel planes extending fore and aft of the machine and each toggle comprises a forward link 23 and a rear link 24 which are hinged or pivotally connected at 25. Links 23 are flat sheet metal links pivotally anchored at their forward ends to a common straight anchor rod 26 extending horizontally across the machine through a rearwardly projecting boss or rib which is formed on fulcrum bar 20 of the sub-frame and has suitable guide slots for the forward ends of links 23. Links 24 are wire links pivotally anchored at 27 each to a different sub-lever above the segment 16. As in the known key-operated typewriter above referred to, the pivotal anchorages 27 of the toggles to the sub-levers all lie normally in a common straight horizontal line across the machine affording uniform leverage connections of the toggles with the arcuate array of sub-levers for actuating links 18 and type bars 13.

Each connected type bar 13, link 18, sub-lever 17 and toggle 23—24 form a type action which normally is disconnected from snatch roll 21 and which is restored to normal rest position by a different one of an array of identical return springs 28. Springs 28 are arranged in a straight row across the machine with their upper ends connected to the straight flanged upper edge of a stop bar 29 which extends horizontally across the machine, said bar having a straight flanged lower toggle stop edge carrying a noise reducing cushion stop pad 29a which normally is abutted by a stop ear 23a formed on and projecting forwardly from the rear end of each toggle link 23. Bar 29 is secured at its ends to the sub-frame side plates 19. In the normal positions of the type actions the type bars are locked against rebound from the type bar rest 14 due to the fact that the toggles are either fully straightened or, preferably and as shown more clearly in FIGURES 4 and 6, their hinge pivots 25 are very slightly above a straight line connecting their pivotal anchorages 26 and 27.

The toggle anchorages 27 normally are all in a line parallel to and slightly higher than the straight horizontal anchor rod 26 so that the toggles normally extend upwardly and rearwardly and so that a straight line connecting the anchorages of each toggle passes approximately through the axis of the snatch roll, the forward toggle links 23 being curved between anchor rod 26 and the toggle hinges 25 to extend under and very close to the snatch roll. Toggle anchorages 27 normally lie at a higher level than the arcuate horizontally disposed sub-lever fulcrum rod 16a in segment 16 and in a vertical transverse plane of the machine forwardly of the segment 16. As in the known key-operated typewriter above referred to, the distance from the sub-lever fulcrum to toggle anchor 27 increases as the length of the sub-lever increases from the medial to the end or side sub-levers of the arcuate array of sub-levers 17 so that like angles of fold of the toggles swing the upper ends of the sub-levers through arcs of like chordal amplitude to swing the type bars with like leverage and speed through printing strokes of like angular amplitude from rest to printing position.

Associated with the type actions are key operated means individual to the respective type actions for effecting a transitory and self-disconnecting driving connection between the snatch roll and the sub-lever actuating toggle of a type action to be actuated for printing. The several key operated means are identical except for the fact that the upper portions of the key carrying stems 30 are varied in shape to support the type keys 31 in the usual four stepped rows or banks of the standard typewriter keyboard and, also, except for the hereinafter described change in a part of the key operated means for one or more repeat typing actions of the machine. A description of such key operated means with a later description of the modified repeat key operated means now will be given.

Each type key 31 is fixed on the upper portion of a key stem 30, the lower portions of the key stems being identically formed and located in a straight row across the machine in which they extend parallel and close to the front inclined face of the sub-frame bar 20. The upper and lower edge portions of bar 20 are cross slotted fore and aft of the machine and have extending therethrough parallel horizontal fulcrum rods 32 and 33, respectively, for pairs of key stem supporting links 34 and 35 respectively pivotally connected at 36 and 37 to the key stems and guided in the frame bar slots. Each pair of links 34—35 forms a parallel link support for the connected key lever, link pivot 36 moving from a higher to a lower level than fulcrum rod 32 upon depression of the key on the key stem, and link pivot 37 having a similar movement with respect to fulcrum rod 33 upon key depression.

The key stems have forward extensions 30a opposite links 34 and engaged in vertical guide slots in a key stem guide comb 38 which is secured at its ends to the sub-frame side plates 19. Extensions 30a also function as key stem depressions stops in connection with a key lever depression controlling bail hereinafter described. At their lower ends opposite links 35 the key stems have forward extensions 30b functioning as key stem return stops and normally abutting a noise reducing cushion stop pad 39 secured to the under face of a rearwardly projecting stop flange 38a formed on the lower edge of the key lever guide comb 38, which comb thus functions also as a key stem return stop bar. Springs 40 are connected to a spring anchor bar 41 and to ears 35a, the ears depending from links 35 below rod 33 to restore the key stems to normal position. The anchor bar extends across the lower front portion of the sub-frame and is journalled in the sub-frame side plates 19 at 42 for adjustable rocking of the anchor bar in a known manner by a suitable adjusting screw 43 having suitable threaded engagement with the main frame at the front of the machine for fore and aft adjustment of the screw to regulate the force required to depress the keys to suit the finger touch of different typists. Such screw adjustable and rockable mounted spring anchor bars for key touch control are well known in the art.

Figure 2:
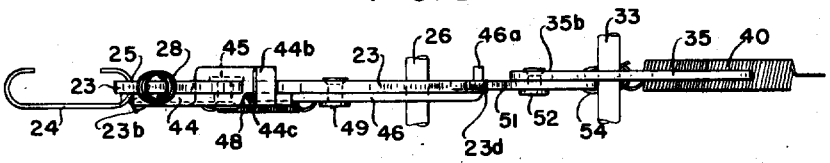
FIGURE 2 is a fragmentary top plan view showing certain parts hereinafter described of a type bar action of the improved machine.

Each flat sheet metal toggle link 23 has a toggle driving pawl 44 pivoted thereto at 45 at substantially the horizontal level of the link pivot 26 and closely behind the snatch roll 21, the pawl and link pivots being approximately at the same horizontal level as the snatch roll axis. The pawl is a sheet metal pawl having a flat body part abutting the left hand flat face of toggle link 23 and extending beyond both edges of the upwardly extending rear portion of the link behind the snatch roll to stabilize the pawl. A laterally bent lug 23b on the link is engaged in an elongated notch 44a in the rear edge of the body part of the pawl to limit rocking of the pawl into and out of toothed engagement with the snatch roll from and to a normal upstanding position of the pawl. Between the snatch roll and the rear portion of link 23 the pawl is bent laterally across the link 23 to form at the upper end of the pawl a broad flat and normally substantially horizontally disposed pawl nose 44b several times as wide as the thickness of the link and having its forward snatch roll engaging portion protruding a substantial distance forwardly of the front edge of the body part of the pawl. The side of the pawl nose 44b is preferably notched as shown at 44c (FIGURE 2) to form a narrow neck connecting the pawl nose to the pawl body part, thereby facilitating bendable adjustment up and down of the snatch roll engaging front end of the pawl nose for the purposes hereinafter described.

Figure 6:
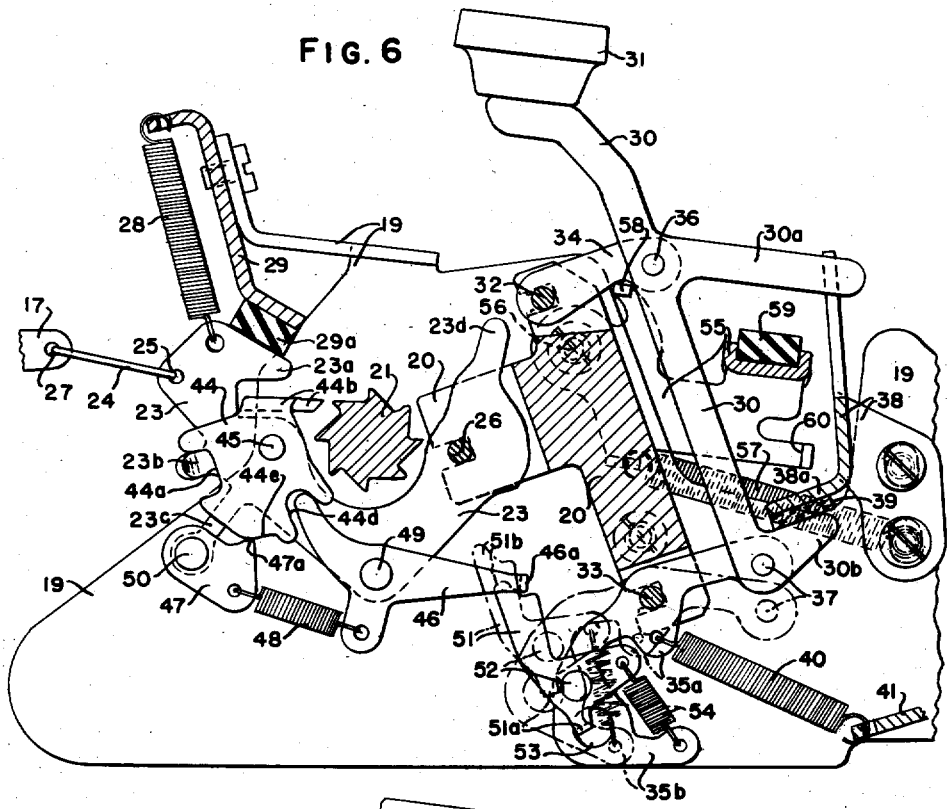

The pawl is rocked to its respective limits of movement relatively to toggle link 23 under control of a pawl rocking lever 46, a pawl rocking cam 47 and a spring 48 connecting said lever and cam, as now will be described. The lever 46 extends fore and aft of the machine at the left hand side of link 23 below the snatch roll and behind the sub-frame bar 20, being pivoted at 49 substantially midway between its ends to link 23 near the lowest part of this curved link and below the snatch roll. A rearwardly extending arm of lever 46 has a lost motion engagement in a radial notch 44d in the body part of pawl 44 forward and below the pawl pivot 45 to yieldingly hold the pawl in its normal position, as shown in FIGURES 1 and 6, under pull of spring 48 which is connected to a depending arm of lever 46 below lever pivot 49 and also is connected to the forward end of the pawl rocking cam 47. Cam 47 is pivoted at its rear end at 50 to a depending ear 23c on toggle link 23 and has an upwardly projecting nose 47a adjacent its forward end normally engaged with the high rear end of a cam edge 44e formed on the lower portion of pawl 44.

Action of the cam on the pawl under pull of spring 48 is in a direction to snap the pawl to its rocked limit for engagement with the snatch roll, but spring 48 normally extends almost in a straight line issuing through the cam pivot and the spring anchor to lever 46 so that lever 46 has a greater leverage on the pawl than the cam 47 and normally holds the pawl rocked to its snatch roll clearing limit relatively to link 23 under pull of spring 48. Accordingly, so long as no key is depressed no type action will be actuated by the constantly rotating snatch roll. Depression of a type key will cause its associated type action to print and the means whereby this is effected now will be described.

The lower supporting link 35 for each type key stem carries a normally upstanding tripping trigger 51 for the driving cam controlling lever 46 of the associated type action, the trigger being pivotally held at 52 to an extension 35b of link 35 curving rearwardly and downwardly from the link pivot below the fulcrum bar. A stop lug 51a on the trigger is engaged in a hole 53 in link extension 35b to limit rocking of the trigger, and a light spring 54 is connected to the trigger and link extension 35b to yieldingly hold the trigger at the normal limit of its rocking movement in which the upper end of the trigger is engaged under, or located very slightly below, a laterally bent lug 46a on the forward end of lever 46. Preferably, trigger 51 has an upstanding projection 51b at its upper end which normally projects upwardly behind lug 46a on the pawl controlling lever 46 to prevent accidental forward slipping of the trigger from beneath lug 46a.

Figure 7:
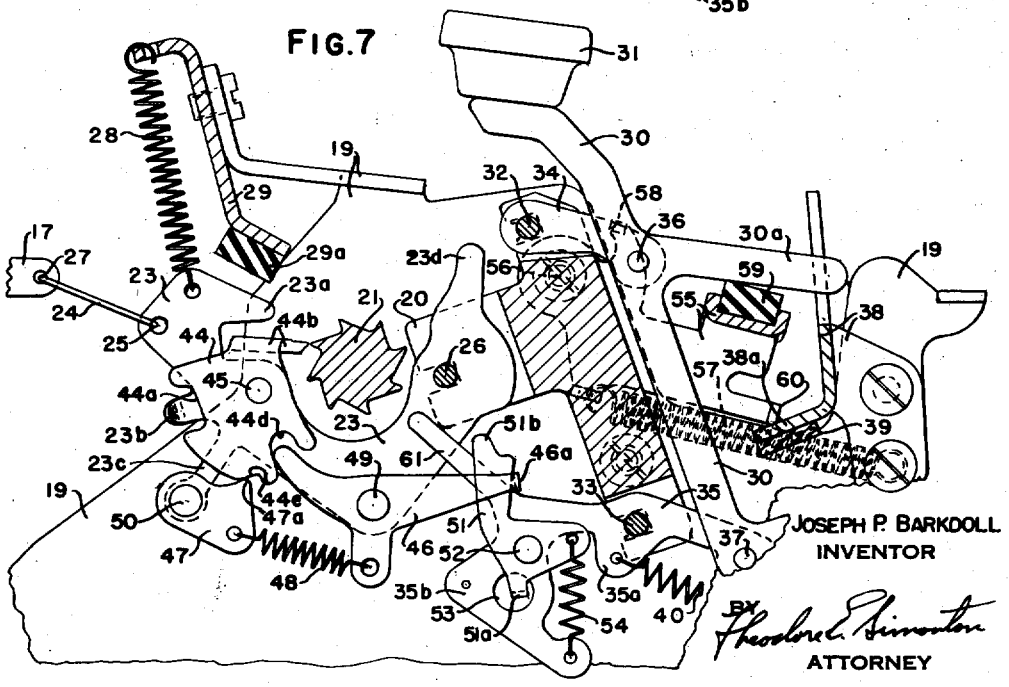
FIGURE 7 is a view similar to FIGURE 5 illustrating the construction and operation of a repeat type bar action of the improved machine.

Depression of the type keys is controlled by a U-shaped bail 55 (FIGURES 3 and 6 ) which has its side arms fulcrumed on the sub-frame side plates 19 at 56 at the outer faces of said plates and has its straight horizontal cross bar extending across the machine between the key stems and the key stem guide comb and normally spaced a short distance below the forwardly projecting key stem extensions 30a. A pair of strong bail return springs 57 connect the bail side with the sub-frame side plates to rock the bail upwardly to its normal position in which stop lugs 58 on the bail side arms engage the sub-frame side plates to arrest upward movement of the bail. The cross bar of the bail carries a noise reducing and shock cushioning pad 59 on its upper face for contact by the key stem extensions 30a. Maximum depression of the bail is determined by the engagement of stop lugs 60 on the forward ends of the bail side arms with the upper edge of sub-frame side plates 19 as shown in FIGURE 7.

The above described key operated means for establishing a transitory and self disconnecting connection of the driving pawls of the type actions with the snatch roll provide for non-repeat typing whether or not a depressed key is held depressed. Desirably one or more of the keys are repeat typing keys and any one or more of the keys in the construction shown regardless of location in the keyboard may be converted to optional non-repeat and repeat typing keys simply by a slight modification of its key stem supporting link 35. This modification consists in providing the rearward extension 35b of the desired link or links 35, as shown in FIGURES 1 and 7, with an upwardly and rearwardly inclined finger 61 affording a cam edge underlying and normally spaced a substantial distance below lug 46a on the forward end of pawl controlling lever 46 for operation as hereinafter described.

Figure 3:
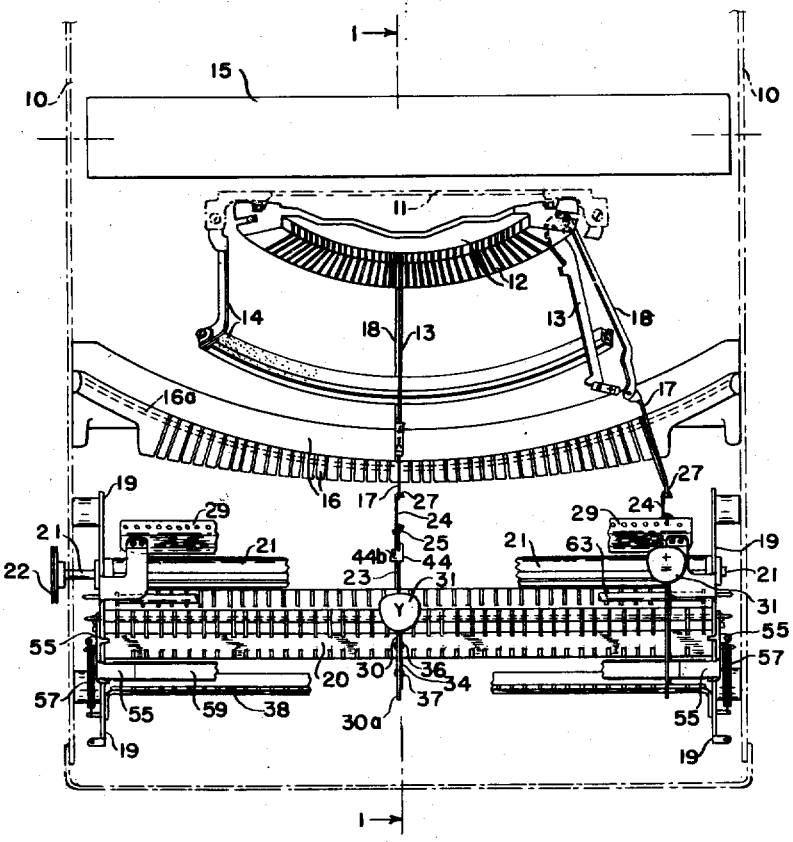
FIGURE 3 is a fragmentary top plan view of the improved machine.

The described power means may be employed to actuate directly or indirectly other elements or parts of the typewriter than the type bars. The machine shown has, for example, the known type bar actuated universal bar 62 which is mounted at the rear of the type bar segment and shown in part in FIGURE 1 and actuates the platen carriage escapement of the known machine above referred to. Also by way of example, a ribbon mechanism actuating universal bar 63 for actuating the inking ribbon mechanism of said known machine is, in the improved machine, journalled on the toggle link fulcrum rod 26 with its horizontal cross bar engaged in front of upward extensions 23d of toggle links 23, as shown in FIGURES 1 and 3, for direct operation by the power means. The two universal bars are returned to normal position by known spring means, not shown.

The mode of operation of the improved mechanism is believed to be obvious to those skilled in the art but now will be described briefly, first with reference to the non-repeat keys and then with reference to the repeat key or keys.

Figure 4:
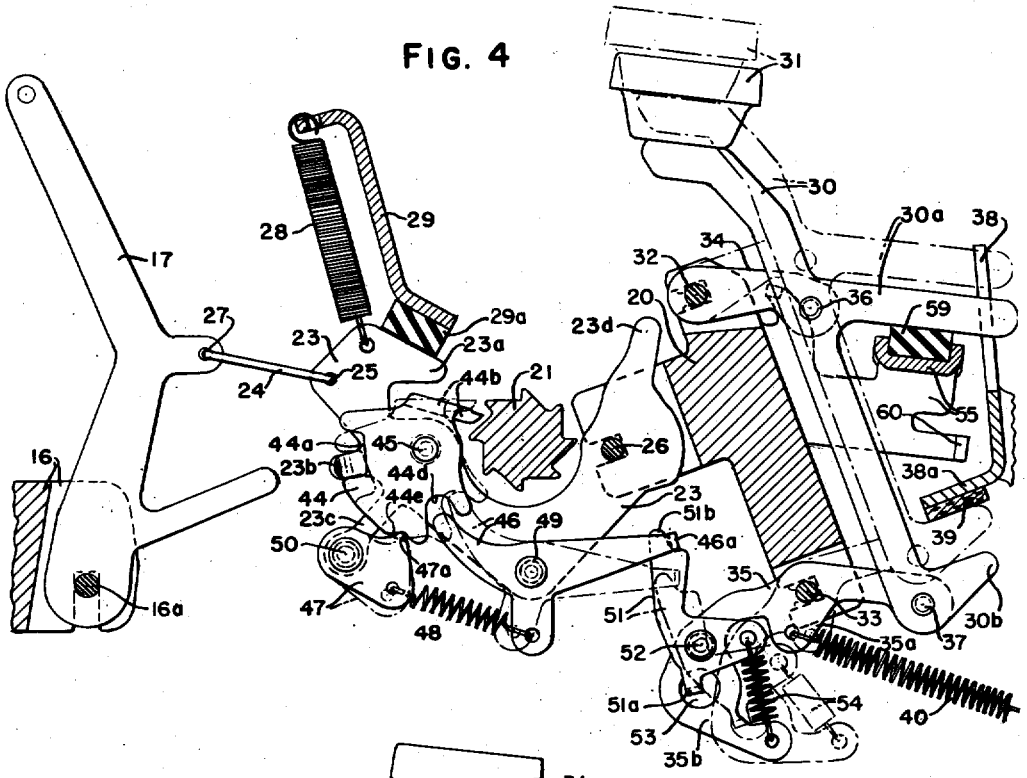
FIGURES 4, 5 and 6 are detail vertical longitudinal sectional views illustrating, as more fully hereinafter described, the construction and operation of non-repeat type bar actions of the improved machine.
Figure 5:
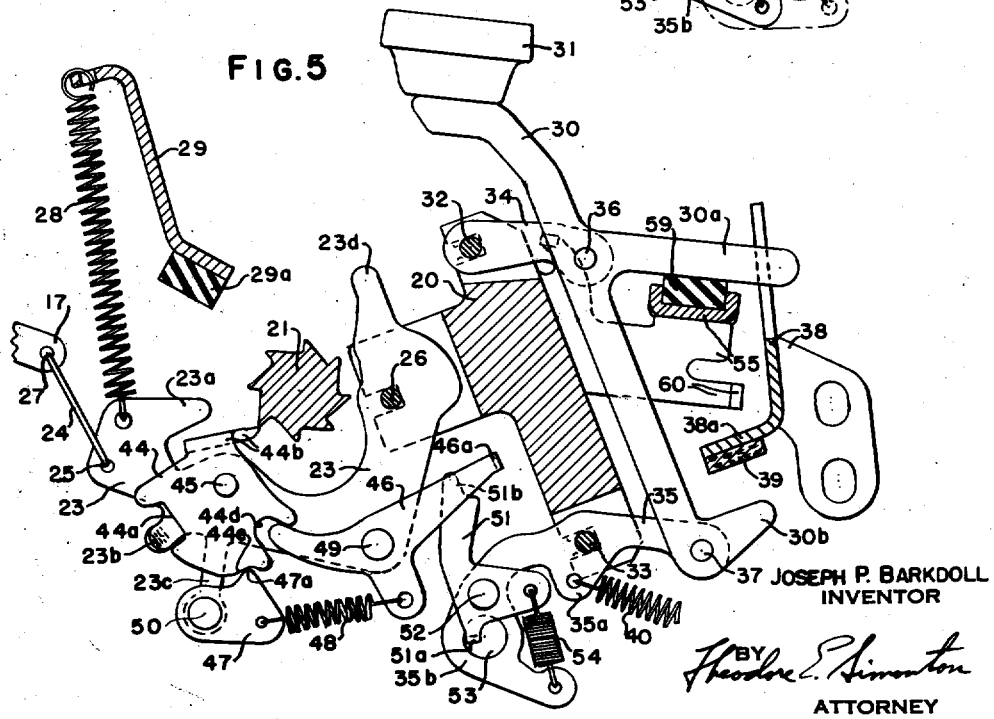

Referring particularly to FIGURES 1, 4, 5 and 6, depression of a non-repeat key from its normal position to its actuated position shown in FIGURES 4 and 5 is arrested by the stiff spring resistance afforded by the key depression control bail, which bail functions as a cushioning down stop for the key stem to determine a normal extent of key depression which, as indicated in FIGURE 4, is short. Such normal key depression causes trigger 51 to rock the pawl control lever 46 to the position shown in full lines in FIGURE 4 stretching the cam spring 48. This movement of lever 46 and the action of cam 47 on the pawl 44 under the pull of spring 48 causes the pawl to snap quickly to its rocked limit for engagement by the snatch roll before lever 46 completes its rocking movement so that when a normal depression of a key ends the lever 46 is out of contact with both ends of notch 44d in pawl 44 and about midway between said ends.

A key may thus be abnormally depressed without jamming the lever 46 against the pawl, and a key may partly return while the spring urged cam 47 holds the pawl positioned for toothed engagement by the snatch roll insuring time for a tooth of the roll to engage and drive the pawl even with a very rapid start of key return. Also a slight partial depression of a key toward its normal depression limit may be made and the key may return without positioning the pawl for toothed engagement with the snatch roll and the pawl will return to normal position, thereby minimizing accidental printing should a typist accidentally brush a key while, for example, depressing another key. Stop lug 23b on link 23 arrests rocking of the pawl with the pawl nose positioned to engage only part way in tooth spaces of the snatch roll so that the pawl nose cannot be jammed against the snatch roll at the roots of the roll teeth. Preferably, the forward edge of the pawl nose is beveled downwardly and rearwardly as shown so that it will cam off of the crest of a snatch roll tooth in the event of collision therewith on key depression.

The pawl is moved into position for engagement by the snatch roll at the rear of the roll where the roll teeth travel in a descending path and where the pawl nose is slightly higher than the axis of the roll and than the fixed fulcrum rod 26 of the pawl-carrying toggle link 23. Engagement of a snatch roll tooth with the positioned or tripped pawl drives the pawl and link 23 downwardly as a unit about the fulcrum rod 26 with the pawl nose moving downward in an arc which is of much greater radius than that traversed by the engaged snatch roll tooth so that the pawl nose travels almost tangent to the snatch roll and rides or is cammed out of engagement with the engaged snatch roll tooth at a point a short distance lower than fulcrum rod 26, all as will be apparent from FIGURES 4 and 5. The toothed engagement of the snatch roll and pawl is very brief, being for approximately two tooth spaces travel of a tooth in the construction shown where the snatch roll has a small major diameter of substantially $13/32$ inch and is relatively coarse toothed, having eight teeth.

At the end of the power drive of the pawl the toggle is folded downwardly with its links almost disposed at a right angle to each other, as shown in FIGURE 5. This power drive starts the connected type bar easily on its printing stroke with substantially no noise or shock and no appreciable wear on the pawl and snatch roll and drives the type bar through approximately 60 degrees of its 90 degree printing stroke at a rapidly and smoothly accelerating rate, the type bar thereafter completing its printing stoke as from point P to point P' (FIGURE 1) by momentum and actuating the escapement operating universal bar 62. Downward folding the toggle operates the ribbon mechanism universal bar 63 through extensions 23d of toggle links 23.

Spring 28 returns the power driven type bar action to normal position after printing. Spring 48 returns lever 46 and pawl 44 to normal position upon self disconnection of the snatch roll and pawl and spring 40 returns the key stem and its supporting links to normal position when finger pressure on the key is released. If key pressure is released immediately the lug 46a of lever 46 will come to rest in normal position at the upper end of the trigger 51, as shown in full lines in FIGURE 6. If the key is held depressed the lever lug 46a will descend in front of trigger 51, as shown in broken lines in FIGURE 6, the yieldable trigger permitting the pawl and lever 46 to assume normal position and preventing a second or repeat typing action until the depressed key is released and again depressed. On release of a held down key the trigger descends and then snaps forwardly under lever lug 46a to normal position.

Referring particularly to FIGURES 1 and 7, the operation of one of the optional non-repeat and repeat actions now will be described. Depression of an optional non-repeat and repeat key a normal extent into contact with the key depression control bail causes a non-repeat operation of a type bar action whether or not the key is so held depressed, the parts operating as in the case of a non-repeat action as above described. Should a repeated operation of the type action be desired the key is forcibly depressed against the resistance of the bail an added extent to the position shown in FIGURE 7 and there held whereupon the action will execute its first printing stroke in the same manner as above described and will automatically execute succeeding printing actions until the key is released. As the type action nears its returned position after each such printing operation while the key is held down the parts assume the position shown in FIGURE 7 in which the lug 46a on lever 46 engages the rearwardly and upwardly inclined upper cam edge of extension 61 of link 35 connected to the stem of the repeat key. Further movement of the returning type action carrying toggle link 23 to, or substantially to, stop 29a causes the cam extension 61 to rock lever 46 back to the position of FIGURE 4 and the driving pawl is snapped by cam 47 back into its snatch roll engaging position of FIGURE 4 and a repeat driving operation of the type action occurs. The action will repeatedly operate until the key is released, whereupon the parts will assume normal position as in the case of the non-repeat actions.

Extension 61 is engageable with the sub-frame bar 20, as shown in FIGURE 7, to arrest rocking of link 35 and key depression for repeat operations and, for the same purposes, lugs 60 on the key depression control bail are engageable with the upper edge of the sub-frame side plates 19. These arresting means prevent undue strain on the parts when a repeat key is abnormally depressed into repeat position.

The construction above shown and described affords a system of type actions capable of effecting high speed typing and of making a large number of clear carbon copies. The easy start and rapid acceleration of the pawl driven type action substantially eliminates noise, shock and wear in the type bar driving parts and on the pawl nose and snatch roll teeth, wear of the pawl nose and teeth being further reduced by the relatively large width of the dog nose affording a long line of contact with a snatch roll tooth. The snatch roll and pawl engagement is self-disconnecting thereby avoiding forcible disengagement with resultant wear, shock and noise at the end of the power drive.

The construction shown makes possible for the first time in the art an efficient power operated portable typewriter. The machine illustrated is approximately 5 5/16 inches high 12 inches wide and 12 9/16 inches long. The snatch roll and forward parts of the type actions extend under the rear portion of the keyboard, the array of type bars and the array of sub-levers at their highest points are little higher than the keyboard, and the lowest part of the platen is approximately level with the highest parts of the keyboard.

For regulating the force of type impact of individual type bars on the platen, the duration of the power drive of any type bar may be varied by bending the nose of the associated driving pawl up or down to respectively increase or decrease the duration of pawl engagement with the snatch roll over that shown in the drawings.

I claim:

1. A power operated typewriter having a power driven rotary toothed snatch roll, a part to be actuated by power from said roll, a member connected to actuate said part and rockable about a fixed axis which is parallel to said roll, a pawl pivoted on the member to rock about an axis parallel to said roll into and out of the path of rotation of the teeth of said roll, means to limit rocking of the pawl in both directions relatively to said member, and means to rock the pawl to its limit for roll tooth engagement and to thereafter rock the pawl to its other limit and hold it there upon disengagement of the pawl and roll, said member carrying the pawl for movement by an engaged roll tooth in a path which carries the pawl out of the path of rotation of the roll teeth following a transitory drive of the pawl and member, and said pawl having provision for adjustment thereof to vary the extent of said transitory drive of the pawl and member.

2. A power operated typewriter having a rotary toothed power driven snatch roll, a member biased to a normal position from which it is rockable about an axis parallel to the roll to actuate a part of the typewriter, a driving pawl pivoted on said member to rock about an axis parallel to the roll from a roller tooth clearing limit to a limit for member driving toothed engagement of the roll and pawl, said roll being located between the pawl and the axis of said member for self disconnection of the pawl and roll upon a transitory drive of the member from its normal position by the engaged roll and pawl, the pawl having a roll tooth engaging nose bendably adjustable to vary the exten of transitory drive of said member from normal position, and key controlled means responsive to key depression to move the pawl to its limit for toothed engagement with the roll and responsive to disengagement of the pawl from the roll to restore the pawl to its roll tooth clearing limit.

3. A power operated typewriter having a toothed snatch roll power driven about a horizontal axis extending transversely of the machine, a part actuating member rockable about an axis which is parallel to the roll and forward of the roll, said member extending under the roll and being upwardly biased to a normal rest position, a pawl pivoted on said member to rock about an axis parallel to the roll and having a nose for toothed engagement with the roll at the rear of the roll, means on said member and pawl to arrest rocking of the pawl at a roll clearing limit and a roll engagement limit, said roll being rotative in a direction to drive the pawl downwardly until it clears the roll following movement of the pawl to its roll engagement limit, the pawl nose being adjustable in an up and down direction to vary the extent of downward drive of the pawl by the roll, a depressible key, and means responsive to depression of the key to rock the pawl to its roll engagement limit and responsive to downward driving of the pawl out of roll engagement to restore the pawl to its roll clearing limit.

4. A power operated typewriter having a part to be actuated, a member rockable about a horizontal axis and operatively connected to said part and biased upwardly to a normal rest position, a pawl pivoted on said member to rock about an axis parallel to that of said member, a toothed snatch roll disposed parallel to said member and pawl axes forward of the pawl and rotative in a direction to drive the pawl downwardly upon toothed engagement of the pawl and roll until the pawl is carried out of engagement with the roll by downward rocking of said member, means on said pawl and member limiting rocking of the pawl to a roll clearing position and a position for toothed engagement with the roll, spring urged means on the member having pawl camming engagement with the pawl to rock the pawl to its roll engagement limit, a second spring urged means on said member to rock the pawl to its roll clearing limit and there hold it upon disengagement of the pawl from the roll, and key operated means operable on said second spring urged means to condition said first spring urged means to rock the pawl to its roll engagement limit.

5. A power operated typewriter, as claimed in claim 4, in which the pawl nose is adjustable in an up and down direction.

6. A power operated typewriter, as claimed in claim 4, in which the second spring urged means is an element rockable on the member about an axis parallel to those of the pawl and member and has a two [day] *way* lost-motion connection with the pawl in which the lost-motion is normally taken up in a direction for engagement of the second spring urged member with the pawl to rock the pawl to its roll clearing limit.

7. A power operated typewriter, as claimed in claim 6, in which the first mentioned spring means includes a pawl camming element rockable on said member about an axis parallel to that of the pawl, and in which a single spring connects the said two rockable elements to exert opposing rocking actions on the pawl of which that of the pawl camming element is the weaker.

8. A power operated typewriter having a pivoted type bar, a type bar action connected with the type bar to impart printing and return strokes to the type bar and including a toggle extending fore and aft of the machine and spring urged to return the type bar to rest position after printing, a stop engageable by a link of said toggle to arrest spring urged movement of the toggle with the toggle in an extended position in which it locks the returned type bar against rebound toward printing position, a toothed power driven snatch roll extending across the toggle, a pawl pivoted on the toggle to rock thereon into and out of the path of travel of the snatch roll teeth and to be driven by an engaged roll tooth to fold the toggle in a direction to impart an accelerating printing stroke to the type bar and carry said pawl out of the path of the teeth before said type bar printing stroke is completed, means to limit rocking of the pawl on the toggle to a roll clearing limit and a limit for roll engagement with the pawl, a first spring urged means on the toggle effective on the pawl to restore the pawl to its roll clearing limit upon disengagement of the pawl from the roll, key operable means effective on said spring urged means to relieve the urge of the spring urged means on the pawl, and a second spring urged means effective on the pawl to move the pawl to its roll engagement limit with a force weaker than that normally exerted on the pawl by the first spring urged means.

9. A power operated typewriter, as claimed in claim 8, wherein the pawl has a nose adjustable to vary the extent of folding of the toggle before the pawl is disengaged from the roll to thereby vary the printing impact of the type bar.

10. A power operated typewriter having an arcuate array of pivoted type bars extending upwardly and forwardly with their pivots in a rearwardly inclined plane, a platen arranged for striking of the type bars at the upper front portion of the platen, an arcuate array of upstanding sub-levers located forwardly of the array of type bars with their pivots in a horizontal plane and the concave side of the sub-lever array facing toward the type bar array, said sub-levers progressively increasing in height from the medial to the end sub-levers of the array, pull links of identical lengths connecting the type bars and the upper ends of the sub-levers adjacent the forward ends of the type bars, parallel fore and aft extending toggles of identical lengths having pivoted anchorages at their rear ends to the sub-levers above the sub-lever pivots along a common straight horizontal line transversely of the sub-lever array and having fixed pivoted anchorages at their forward ends along a straight horizontal line parallel to the first mentioned horizontal line, a power driven toothed snatch roll extending across the toggles above the toggles and between and parallel to said horizontal lines in which the toggle anchorages normally lie, a toggle stop, springs urging the toggles individually upwardly against said toggle stop to identical extended conditions in which the hinge of each toggle is at least as high as a straight line connecting the toggle anchorages, driving pawls rockable on the respective toggles from a snatch roll clearing limit to a limit for toothed engagement of the roll with the pawls at the rear of the roll which drives the pawls downwardly and folds the toggles downwardly until the pawls are carried out of engagement with the roll, and individual key controlled means for effecting engagements of the pawls selectively with the roll and thereafter restoring the pawls to their roll clearing limits when the pawls disengage from the roll.

11. A power operated typewriter, as claimed in claim 10, wherein each pawl has a nose adjustable in an up and down direction.

12. A power operated typewriter, as claimed in claim 10, having spring urged cam means on the toggles adapted to press the pawls to their limit for toothed engagement by the roll, spring urged lever means on the toggles to overcome the cam means and normally restore the pawls to their roll clearing limit, and key operable means engageable with said spring urged lever means to rock the lever means in opposition to its spring urge.

13. A power operated typewriter, as claimed in claim 10, wherein the key controlled means includes a keyboard partly overhanging the toggles and snatch roll.

14. A power operated typewriter, as claimed in claim 13, wherein the typewriter has a main frame supporting the type bars and sub-levers, and a sub-frame mounted in the forward part of the main frame and supporting the fixed toggle anchorages, the toggle stop, the toggle return springs, the snatch roll and the keyboard.

15. A power operated typewriter, as claimed in claim 13, wherein the keyboard comprises stepped banks of keys, stems carrying said keys, two superposed rows of fore and aft extending parallel links with one link of each row supporting a key stem, springs connecting the links of the lower row with the sub-frame to urge the keys upwardly to normal position, and stop means on the sub-frame normally engaged over stop means on the key stems.

16. A power operated typewriter, as claimed in claim 15, wherein the lower supporting links of the key stems carry triggers for rocking the pawl rocking lever means in opposition to their spring urge upon key depression.

17. A power operated typewriter having a part to be actuated, a member rockable about a fixed axis extending transversely of the machine to actuate said part, a power driven toothed snatch roll parallel to the member axis, a pawl pivoted on said member to rock to a roll clearing limit and a roll engagement limit, a spring urged lever pivoted on said member to rock about an axis parallel to the pawl axis and normally abutted behind the lever pivot with a part of said pawl to urge the pawl to its roll clearing limit, spring urged cam means pivoted on said member to urge the pawl to its roll engagement limit with less effective force than that exerted on the pawl by said lever, a depressible key carrying stem, upper and lower fore and aft extending parallel links supporting the key carrying stem at their forward ends and fulcrumed in the machine to rock about axes parallel to that of said member, the lower link having a rearward extension, a trigger pivoted on said link extension to rock fore and aft of the machine and normally spring urged against a part of said extension to extend above said extension with its upper end underlying a part of said lever forward of the lever pivot to rock the lever in opposition to the spring urge of the lever when the key is depressed, the trigger engageable part of the lever being movable in front of said trigger on pawl return when the key is held depressed and said trigger being rearwardly rockable by said lever part to permit return of the pawl and prevent a second actuation of said lever by the trigger when the key is held depressed, a return spring for the key stem and its supporting links, a return stop engageable by the key stem to determine the normal position of the key, a key depression control stop spring urged to a normal position in which it is engageable by the key stem at the end of a normal extent of depression of the key which rocks said lever at least far enough to permit movement of the pawl to its roll engagement limit and permits intentional further depression of the key to an abnormal limit, and means to arrest forcible depression of the key at said abnormal limit, said trigger supporting link extension having an upper cam edge engageable under the lever forward of the lever pivot during the end portion of the return movement of the member following each drive of the pawl member to rock the lever for re-engagement of the pawl by the roll so long as the key is held abnormally depressed.

18. A power operated typewriter, as claimed in claim 17, having a plurality of such means for selectively actuating a set of type bars, the actuating means for one or more of the type bars having said cam edge on the lower key stem supporting link and the remainder having lower key stem supporting links incapable of engaging the lever when the associated keys are depressed to and held at their abnormal depression limit, and wherein the key depression stop comprises a bail engageable by all of the key stems when the keys are depressed.

19. A power operated typewriter, as claimed in claim 18, having abnormal key depression limit stops engageable respectively by the bail and by the rearward extension of the lower key stem supporting link, a vertically slotted key stem guide comb, and a forward key stem extension engageable in a slot of said comb and overhanging the bail to engage the bail for control of key depression.

*20. A power operated typewriter having a rotary power roll, a part to be actuated by power from said roll, a member connected to actuate said part and rockable about a fixed axis parallel to said roll, an actuator pivoted on the member to rock about an axis parallel to said roll into and out of engagement with said roll, means to limit rocking of the actuator in both directions relative to said member, and means to rock the actuator to its limit for roll engagement and to thereafter rock the actuator to its other limit and hold it there upon disengagement of the actuator and roll, said member carrying the actuator for movement in a path which carries the actuator out on the path of rotation of the roll following a transitory drive of the actuator and member.*

*21. A power operated typewriter having a rotary power roll, a part to be actuated by power from said roll, a member connected to actuate said part and rockable about a fixed axis which is parallel to said roll, an actuator pivoted on the member to rock about an axis parallel to said roll into and out of driving engagement with said roll, means to limit rocking of the actuator in both directions relative to said member, and means to rock the actuator to its limit for roll engagement and to thereafter rock the actuator to its other limit and hold it there upon disengagement of the actuator and roll, said member carrying the actuator for movement in a path which carries the actuator out of the path of rotation of the roll following a transitory drive of the actuator and member, and said actuator having provision for adjustment thereof to vary the extent of said transitory drive of the actuator and member.*

*22. A power operated typewriter having a rotary power driven roll, a member biased to a normal position from which it is rockable about an axis parallel to the roll to actuate a part of the typewriter, an actuator pivoted on said member to rock about an axis parallel to the roll from a roll clearing limit to a limit for member driving engagement of the roll and actuator, said roll being located for self disconnection of the actuator and roll upon a transitory drive of the member from its normal position by the engaged roll and actuator, and key controlled means responsive to key depression to move the actuator to its limit for engagement with the roll and responsive to disengagement of the actuator from the roll to restore the actuator to its roll clearing limit.*

*23. A power operated typewriter having a part to be actuated, a rockable member connected to said part and biased to a normal rest position, an actuator pivoted on said member to rock about an axis parallel to that of said member, a power roll disposed parallel to said member and actuator axes and rotative in a direction to drive the actuator upon engagement of the actuator and roll until the actuator is carried out of engagement with the roll by rocking of said member, means limiting rocking of the actuator to a roll clearing position and a position for driving engagement with the roll, a first means biasing the actuator to its roll engagement limit, a second means biasing the actuator to its roll clearing limit and operative to there hold it upon disengagement of the actuator from the roll, and key operated means operable on said second means to condition said first means to rock the actuator to its roll engagement limit.*

*24. A power operated typewriter, as claimed in claim 23, in which the second means is an element rockable on the member about an axis parallel to those of the actuator and member and has a two way lost-motion connection with the actuator in which the lost-motion is normally taken up in a direction for engagement of the second means with the actuator to rock the actuator to its roll clearing limit.*

*25. A power operated typewriter, as claimed in claim 24, in which the first means includes an actuator camming element rockable on said member about an axis parallel to that of the actuator, and in which a single spring connects the said two rockable elements to exert opposing rocking actions on the actuator of which that of the actuator camming element is the weaker.*

References Cited in the file of this patent or the original patent

UNITED STATES PATENTS

| | | |
|---|---|---|
| 1,737,982 | Stickney | Dec. 3, 1929 |
| 2,043,393 | Pasinski | June 9, 1936 |
| 2,567,945 | Kupper | Sept. 18, 1951 |